June 27, 1950 L. E. MESKE 2,512,666
VEHICLE-CARRIED SINGLE-PASS TREE CUTTER
Filed June 3, 1946 2 Sheets-Sheet 2
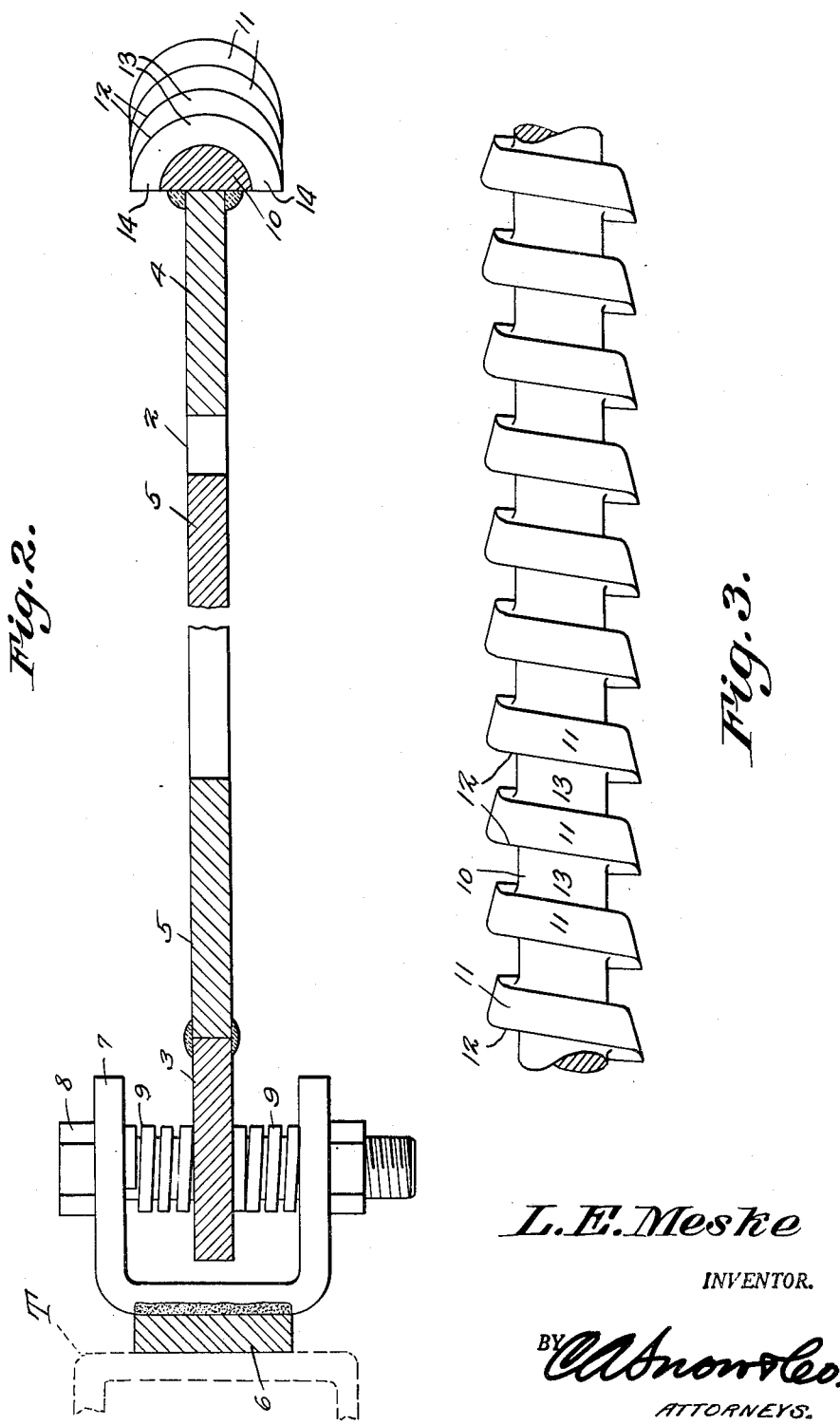
L. E. Meske
INVENTOR.
ATTORNEYS.

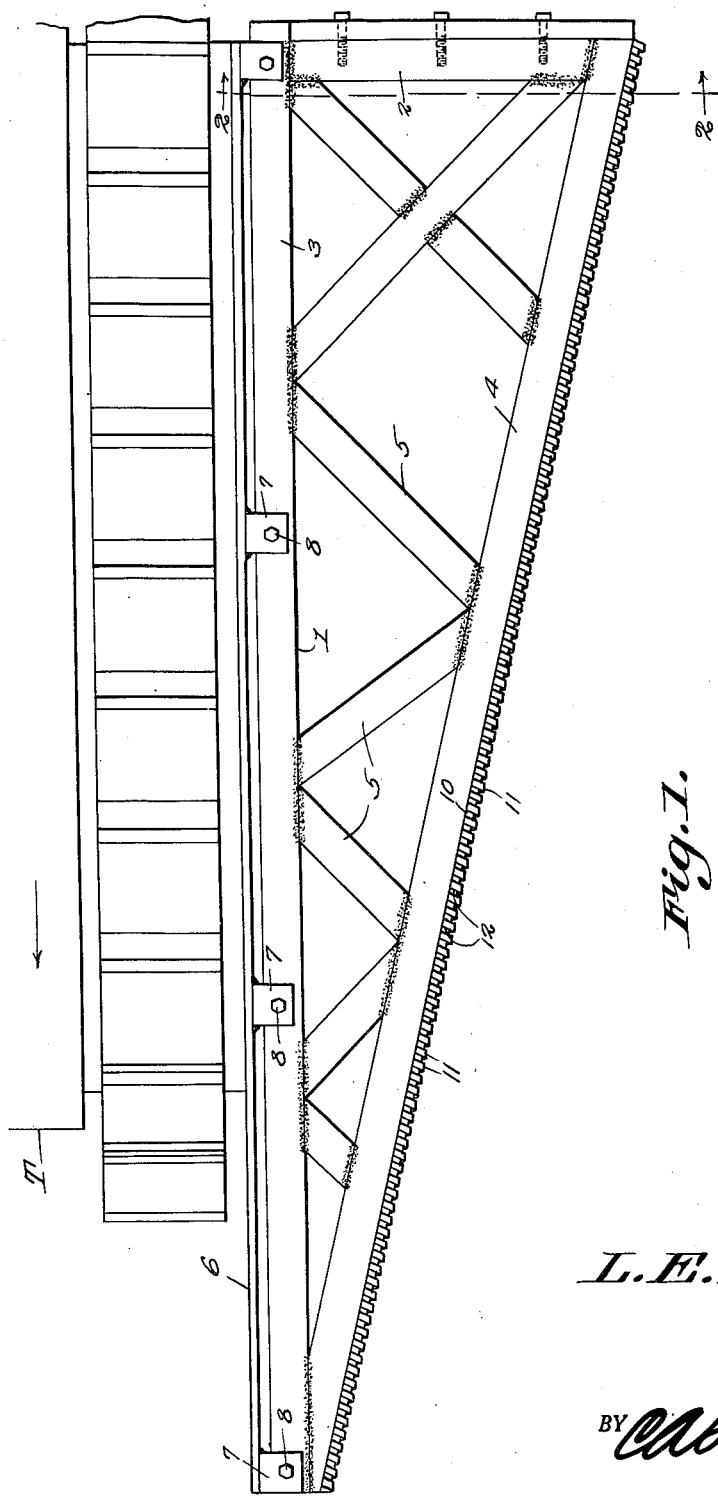

Patented June 27, 1950

2,512,666

UNITED STATES PATENT OFFICE 2,512,666

VEHICLE-CARRIED SINGLE-PASS TREE CUTTER

Lloyd E. Meske, Missoula, Mont.

Application June 3, 1946, Serial No. 673,939

4 Claims. (Cl. 144—34)

This invention relates to a tree cutter, one of the objects being to provide a means which, when applied to a large vehicle of the tractor type, such as commonly used in logging operations, it will be possible to saw through a tree while it is being passed by the vehicle, thereby expediting greatly the operation of felling trees of various sizes.

Another object is to provide a cutting means which is simple but strong and effective and which can be applied readily to a vehicle.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings:

Figure 1 is a top plan view of a portion of a tractor to which the present improvements are applied.

Figure 2 is an enlarged section taken on line 2—2 Figure 1.

Figure 3 is an enlarged side elevation of a portion of the cutter per se.

Referring to the figures by characters of reference, 1 designates an elongated truss-like frame in the form of a right angle triangle and consisting preferably of comparatively thin but strong strips of steel or the like forming the base 2, perpendicular 3 and hypotenuse 4 of the triangular frame. The frame 1 is suitably braced as indicated at 5 and it is to be noted that all of the parts of the frame are located substantially in the same plane.

An attaching beam 6 is secured fixedly to one side of the tractor or other heavy vehicle T to which the cutter is to be fastened and the length of this beam is substantially the length of the frame 1. The beam is provided on its outer side with laterally extended U shaped holders 7 adapted to straddle the perpendicular 3 of the triangular frame and each of these holders has a bolt 8 extended downwardly therethrough and also through the adjacent side of the frame 1. Compression springs 9 are mounted on the bolt above and below the side 3 of the frame 1 so as to exert a constant pressure against the upper and lower faces of said side 3 and hold the side normally substantially centered within the holder 7. A sufficient number of these holders 7 with bolts and springs is provided to maintain the frame 1 in a substantially horizontal position extended well beyond one side of the vehicle T and when the cutter is properly positioned the small end of the apex thereof is supported adjacent to the front of the tractor T.

The cutting element of the attachment is arranged along the oblique or hypotenuse side 4 of the frame. This cutting element is in the form of a bar pin which can be semi-circular in cross section and provided, on its curved surface with a succession of spiral cutting blades 11 of equal size which are spaced apart regular distances and each of which is inclined backwardly and inwardly towards the bar 10 from its advancing or cutting edge 12. The spaces between the blades are designated 13, and constitute chip-receiving spaces. Referring to Figure 2, the opposite ends 14 of the spaces 13 open away from the cutting side of the blade assembly. Thus these blades, which extend through approximately one hundred eighty degrees, serve to successively engage and ream out the side of a tree trunk or the like with which the attachment is brought into contact during the advance movement of the vehicle to which the attachment is secured. As the blades ream out the trunk, chips are received in the spaces 13 and are forced out and clear of the cutting portion of the blade assembly.

In practice the cutter is mounted on the side of the vehicle which must be of a heavy type such as is used in logging so as to have the necessary weight and power to enable the attachment to perform the desired functions. As before stated, the small or apex end of the attachment is in front and the cutting blades are disposed in a series extending backwardly and laterally away from this forward end.

As the tractor or other vehicle moves forwardly past the tree or other object to be severed, the cutting elements are brought into contact successively with the object and serve to ream out a gradually deepening channel extending transversely of the tree trunk or the like so that by the time the attachment has passed the object or objects being acted on, said object or objects will have been entirely or completely severed. As each cutting blade enters the channel, it begins to cut, and each blade contributes its part by cutting continuously until it passes out the other end of the channel. This is due to the fact that the blades are all of equal size, and are disposed in a line angular to the line of movement of the vehicle T.

By tapering or pitching the cutting blades backwardly they can promptly clear the structure after each cutting operation and by spacing them apart, the chips or shavings will fall freely from between the blades so that the cutter will not become clogged.

It has been found in actual practice that with an attachment such as herein described, when applied to a tractor or other vehicle having the requisite power and weight, it becomes possible to cut a path among standing trees of different sizes, brush, etc., with the minimum labor.

The resilient support for the frame 1 provided by the opposed springs 9 permit the frame to yield or flex upwardly or downwardly while in engagement with the object being cut and during any relative up or down movement of the vehicle carrying it.

What is claimed is:

1. An attachment for tractors and the like including a flat frame, means for supporting the frame in a substantially horizontal position beyond one side of the tractor or the like, said frame having its outer side positioned at an acute angle relative to the opposite side thereof, and a longitudinal series of regularly spaced arcuate cutting blades of equal size and spirally pitched, carried by the outer side of the frame and fixed relative thereto, the spaces between the blades opening at their ends to discharge chips away from and clear of the cutting edges of the blades.

2. A tree cutting attachment for tractors and the like including a frame defining a right angle triangle, means for connecting one side of the frame to the tractor or the like with the apex of said frame in front and said side parallel with the direction of movement of the tractor or the like, and a series of regularly spaced spirally pitched arcuate cutting blades fixedly connected to the outer hypotenuse side of the frame, said blades being of equal size, the spaces between the blades opening at their ends to discharge chips away from and clear of the cutting edges of the blades.

3. An attachment for cutting trees or the like, comprising a triangular frame having an inner side and an outer side, means for fastening said frame with its inner side substantially parallel with a side of a tractor or the like for movement therewith and with the apex of the frame in front, the opposite side of said frame being extended laterally and rearwardly away from the apex, and a longitudinal series of arcuate cutting blades of equal size carried by the outer side of the frame, there being spaces between the blades opening at their ends away from the cutting edges of the blades to receive and discharge chips, each of said blades having an advancing cutting edge and each blade being inclined inwardly towards the frame from the cutting edge, each blade being extended through approximately one hundred eighty degrees, and defining a part of a screw.

4. An attachment for tractors and the like comprising a frame having an inner side and an outer side disposed at an acute angle relative to each other, said outer side being extended rearwardly and laterally from the apex of the frame, a resilient centering means connected to the inner side of the frame, means for joining said centering means to one side of the tractor or the like, thereby to support the inner side of the frame substantially parallel with direction of movement of said tractor or the like, and a longitudinal series of spaced arcuate cutting blades of equal size arranged in regularly spaced relation along the outer side of the frame, there being spaces between the blades opening at their ends to discharge chips away from and clear of the cutting edges of the blades, each blade being tapered backwardly from its forward or cutting edge and being extended through substantially one hundred eighty degrees, each blade defining a portion of a spiral.

LLOYD E. MESKE.

REFERENCES CITED

The following references are of record in the file of this patent:

UNITED STATES PATENTS

| Number | Name | Date |
|---|---|---|
| 927,612 | Stevens | July 13, 1909 |
| 1,443,058 | Taylor | Jan. 23, 1923 |
| 1,849,392 | West | Mar. 15, 1932 |
| 2,158,541 | Horstmann | May 16, 1939 |
| 2,309,223 | Staring | Jan. 26, 1943 |
| 2,336,124 | Phoenix | Dec. 7, 1943 |
| 2,392,481 | Kaplan et al. | Jan. 8, 1946 |

FOREIGN PATENTS

| Number | Country | Date |
|---|---|---|
| 318,367 | Germany | Jan. 24, 1920 |

OTHER REFERENCES

"Desperate Desmond" from The Evening Star, Washington, D. C., Nov. 1910.